Oct. 24, 1961 C. W. LEDIN ET AL 3,005,675

FLUID BEARING CONTROL FOR A MAGNETIC HEAD

Filed March 16, 1956 3 Sheets-Sheet 1

INVENTORS
CARL W. LEDIN
WILLIAM J. GORMAN
GEORGE E. ENGMAN

BY Joseph Weingarten
ATTORNEY

FLUID BEARING CONTROL FOR A MAGNETIC HEAD

Filed March 16, 1956 3 Sheets-Sheet 2

INVENTORS
CARL W. LEDIN
WILLIAM J. GORMAN
GEORGE E. ENGMAN

BY Joseph Weingarten
ATTORNEY

INVENTORS
CARL W. LEDIN
WILLIAM J. GORMAN
GEORGE E. ENGMAN

BY Joseph Weingarten
ATTORNEY

United States Patent Office 3,005,675

Patented Oct. 24, 1961

3,005,675

FLUID BEARING CONTROL FOR A MAGNETIC HEAD

Carl W. Ledin, Islington, William J. Gorman, Lynn, and George E. Engman, Saxonville, Mass., assignors to Laboratory for Electronics, Inc., Boston, Mass., a corporation of Delaware Filed Mar. 16, 1956, Ser. No. 572,025
6 Claims. (Cl. 346—74)

The present invention relates in general to new and improved means for processing information in magnetic data storage systems.

The term processing information is taken as descriptive of the process of recording of data, i.e., the transfer of information into the storage system, as well as the reading of data out of the system. In the following discussion, for the sake of clarity, reference will be had to the recording of data, it being understood that the improvements discussed herein are equally applicable when data is read out.

In general, the term magnetic recording relates to a process whereby data is stored in a magnetic medium, the data to be stored being transferred to the recording surface of the magnetic medium by means of a magnetic head. The data signals may be in analog or digital form having spectral components at audio frequencies or higher. Magnetic storage systems are peculiarly adapted to the processing of data reduced to binary code notation. In such notation the data is reduced to binary digits or bits, one bit of data being represented by either a Zero or a One pulse.

The number of bits of data which may be stored per linear inch of recording surface is limited, among other factors, by the spacing of the pole pieces of the magnetic head from the recording surface of the magnetic medium. The pole pieces are separated from each other by a short gap and terminate in a common pole face surface having the gap traverse its width. Magnetic flux lines are set up between the pole pieces across the gap, the fringing flux lines encountering the recording surface and magnetizing a predetermined portion thereof. A short gap is necessary to yield high resolution when recording, as well as when reading data out of the system. The ratio between gap length and the wavelength of stored data should not exceed 1:4. For example, in high density recording of the order of 1000 bits per inch, the gap length should not exceed ¼ mil. The spacing of the pole face surface from the recording surface, as measured at the gap, is in large part responsible for the spreading of magnetic flux between these surfaces. When flux spreading occurs, the lines of flux which fringe between the two pole pieces, magnetize a greater than desired portion of the recording surface. In magnetic data storage systems, where the wavelength of the recorded information measured along the recording medium is relatively short, for example high-density digital data storage systems where the number of bits to be stored per linear inch may exceed one thousand, minimum flux spreading is required to concentrate the magnetic field and bring about high resolution of data. Accordingly, minimum spacing between the surfaces is necessary.

In the past, different solutions to this problem have been attempted with varying degrees of success. In-contact recording, where the spacing between the surfaces is zero and the pole pieces ride in contact with the recording surface, while eliminating flux spreading due to the separation of the surfaces, entails the problem of wear due to abrasion, chipping and scoring of the pole face surfaces and of the medium recording surface. Chipping of the pole face surfaces in the vicinity of the gap between the pole pieces is particularly pronounced where ferrite heads are used. To a certain extent abrasive wear may be alleviated in in-contact recording apparatus by means of boundary (thin film) lubrication. However, in long term usage the loss of pole piece material due to abrasion and, more significantly in the case of ferrite, due to chipping still presents an important problem. It must be kept in mind that the loss of a 10 mil chip in the vicinity of the gap may represent the loss of one third of the width of a 30 mil wide pole face surface and hence, may result in the loss of data. Of even greater importance is the fact that chipping in the vicinity of the gap may increase the effective gap length thereby reducing resolution in reading out data, as well as reducing the practical linear bit density, which may be recorded.

The physical separation between the pole face surface and the recording surface which will maintain tolerable flux spreading in high-density magnetic data recording of the order of 1000 bits per inch is approximately 0.2 mil as measured at the gap of the pole face surface. The mechanical problem of fixedly mounting a multitude of magnetic heads to have their pole face surfaces at a distance of 0.2 mil from a moving multitrack recording surface is staggering and the cost is prohibitive, where expansion and contraction of the materials present due to ambient temperature changes alone may account for a variation in the separation spacing of more than 0.2 mil. Similarly, lack of uniformity of the recording surface, or eccentricity in the mounting of the magnetic surfaces, may occasion substantial variations of the spacing. In another solution to this problem, air is blown against the recording surface through a nozzle attached to each individual head or head mount. The Venturi forces brought about by the escape of air from the space between the recording surface and the pole face surface of the head, float the latter out of contact with the recording surface at a distance dependent partially upon the air pressure which is maintained. This arrangement is extremely complex when it is considered that the individual head mounts must be movably arranged to vary the spacing between the surfaces in response to small air pressure changes, while at the same time carrying the air nozzles and a portion of the air supply means. Additionally, constant separation of the surfaces is critically dependent upon constant air pressure.

It will be appreciated that a need exists for improved means for out-of-contact processing of information in short wavelength magnetic data storage systems.

Accordingly, it is an object of this invention to provide new and improved means for processing information in short wavelength magnetic data storage systems which are not subject to the foregoing disadvantages.

It is a further object of this invention to provide means in high density magnetic data storage systems capable of creating a hydrodynamic effect to maintain constant separation between the pole face surface of a magnetic head and the recording surface of a magnetic medium.

It is another object of this invention to provide apparatus capable of applying a fluid in out-of-contact magnetic data recording apparatus, wherein constant separation between the surfaces of the magnetic heads and the recording surface of the magnetic medium is not critically dependent upon the pressure of the fluid supply, the uniformity of the recording surface, or the precise mounting of the magnetic surfaces.

It is an additional object of this invention to provide apparatus capable of applying oil to the recording surface of a magnetic drum to furnish a constant washing action, thereby alleviating the danger of damage to the magnetic surfaces due to adhering metal and dirt particles, or the loss of data due to the same cause.

In providing means for carrying out the invention, the system which forms the subject matter of this application comprises an oil sump, oil straining and filtering means, a pump, electrical means relating the action of the pump to the operation of the drum motor, an oil pressure regulator and means for applying the oil to the recording surface to form a uniform film of oil thereon.

These and other novel features of the invention together with further objects and advantages thereof will become more apparent from the following detailed specification with reference to the accompanying drawings, in which.

Figure 1:
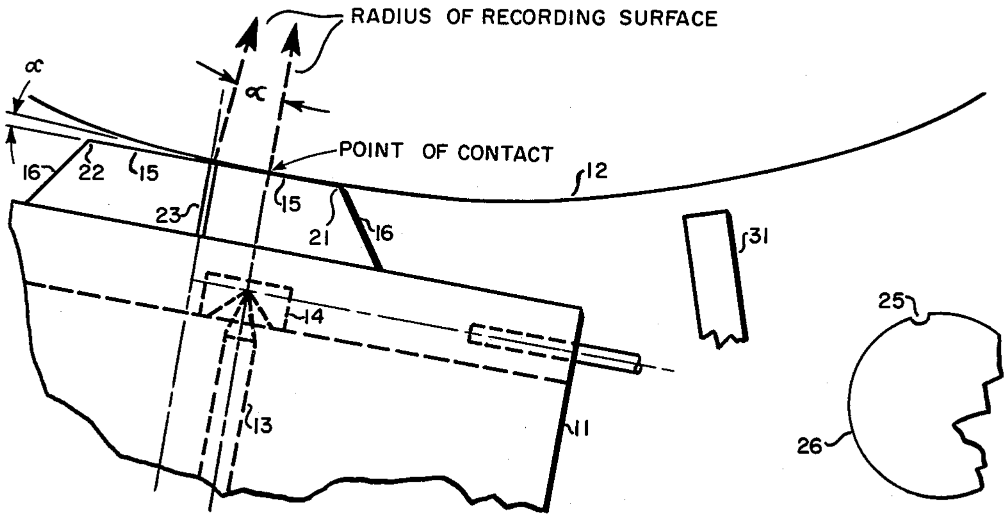
FIG. 1 illustrates the operation of the apparatus prior to the application of oil with the drum at rest.

In practicing the invention to obtain the above objects, the principle of fluid dynamics utilized herein is referred to as hydrodynamic or thick-film lubrication. The techniques employed in the application of this principle are more fully set forth in a co-pending application by Harrison W. Fuller and Carl W. Ledin entitled, "Magnetic Data Storage Techniques," Serial No. 564,229, filed February 8, 1956 and in a companion case by Harrison W. Fuller, Sidney P. Woodsum and William T. Darou, Jr., entitled, "Magnetic Head Assemblies," Serial No. 566,261, filed February 17, 1956. In hydrodynamic lubrication, contact between the two surfaces being lubricated is completely avoided. In contra-distinction thereto, in the more familiar thin film lubrication at least partial contact of the surfaces may be expected. A plane slider bearing is an example of a configuration which utilizes hydrodynamic lubrication. Here, a load is supported by a rectangular pad, the surface of which presses upon a bearing surface. Relative lateral motion between the two surfaces is initiated and a lubricating fluid is maintained in the space between them. Hydrodynamic lubrication will take place if the surfaces are maintained at a tilt angle with respect to each other. This angle is dependent upon the pad geometry, the position of the point of load application to the pad, the magnitude of the load, the relative velocity of the surfaces, the viscosity of the fluid and, in the case of a pivotally mounted surface, on the position of the pivot axis. In one form of the plane slider bearing, the pad is pivoted about a line axis which is positioned off the center of the pad away from the leading edge of the pad surface. The leading edge of the pad surface is defined as the edge which first encounters the bearing surface due to the relative lateral motion of the two surfaces. The load is applied to the pad at the pivot axis. The motion of the lubricant between the two surfaces is such as to produce a positive (supporting) pressure distribution along the length of the pad. This pressure distribution results in a movement about the pivot axis, tending to rotate the leading edge of the pad surface away from the bearing surface until an equilibrium position is reached at the tilt angle. The total supporting force on the pad, resulting from the integration over the pad surface of the positive pressure distribution, exactly equals the load applied to the pad in the equilibrium condition. Thus, in equilibrium a minimum non-zero separation occurs at the trailing edge of the pad, which is dependent on the above-recited parameters. Additionally, a frictional force acts in a direction opposite to the direction of relative lateral motion, but is small enough to be without appreciable effect on the equilibrium geometry.

In another form of the plane slider bearing, the pad is not pivoted and the tilt angle of the pad is structurally fixed, said fixed tilt angle being of equal magnitude to that assumed by a pivoted pad in operation, all other parameters remaining the same.

Further variations of the slider bearing are possible. For instance, neither the pad surface nor the bearing surface need to be planes. If one surface is convex relative to the other one, the system will operate as a crown bearing. It should be noted that minimum separation in the plane slider occurs at the trailing edge of the pad. In the crown bearing, the point of minimum separation may be positioned more conveniently. Furthermore, in the crown bearing the pivot point may be at the center of the pad. In the slider bearing this is theoretically impossible since the total integrated supporting force on the pad would then equal zero and could not balance the applied load.

The instant invention consists of means for providing the hydrodynamic effect described above to obtain constant separation between the pole face surface of the pole pieces of a magnetic head and the recording surface of a magnetic medium in high-density magnetic data storage systems. In practice, the two surfaces are biased toward each other through the application of force. Thereafter, an exchange of data between the pole pieces and the recording surface may be effected. Relative lateral motion of the two surfaces is initiated to expose different portions of the recording surface to the action of the magnetic head. In one embodiment, one of the surfaces is pivotally arranged with respect to the other one to form the desired angle of inclination or tilt angle, therewith. A lubricating fluid is applied to keep at least a portion of the space between the surfaces filled. The relative lateral motion of the surfaces produces fluid flow which develops a hydrodynamic effect to cause the leading edge of the pivotally mounted surface to increase its spacing from the recording surface relative to the trailing edge. The hydrodynamic effect further exerts a lifting force, a component of which balances the biasing force at a predetermined spacing of the surfaces. It will be understood that the identical equilibrium condition may be achieved where no pivoting is used and the tilt angle between the surfaces is structurally fixed, all other parameters remaining the same. Hydrodynamic lubrication is applicable to any shape of magnetic medium, provided only that the recording surface is uniform so that constant separation may be maintained between it and the pole face surface of a magnetic head to facilitate the exchange of data between said surfaces. Thus, the medium may be in sheet, disk, strip, band or wire form, etc., and may be attached to a suitable support, or be driven directly to obtain lateral motion relative to the pole face surface. The support may be a drum, disk, roller, wheel, bobbin, etc. or a plane surface or may, in fact, itself consist of magnetic material and constitute the magnetic medium.

Similarly, the magnetic head and its pole face surface may have any desired shape although the latter will at least in part be determined by such factors as the recording requirements, the shape of the recording medium, the relative configuraion of both surfaces, the velocity of fluid flow, the nature of the fluid used and the manner of its application. Inasmuch as the configuration of the recording surface of the magnetic medium is largely governed by electrical design considerations, the pole face surface of the magnetic head must be shaped to take into account the above mentioned parameters. For example, the smaller the viscosity of a given liquid used, the smaller the hydrodynamic supporting force and hence, the smaller the separation obtained. Since relative surface speed determines the velocity of liquid flow, it will also determine the hydrodynamic supporting force exerted. Where relative surface speed and the viscosity of the lubricant are constant, the hydrodynamic force will be a function of surface area. The greater the area of the surface, the greater the force exerted thereon. Additionally, the component of hydrodynamic force available to balance the biasing force is dependent on the relative configuration of the pole face and recording surfaces, respectively. If both are flat, and there is relative lateral motion between them, the system will operate like a plane slider bearing. Where the system operates as a crown bearing, the equilibrium separation obtained, all other factors remaining equal, will be different from that of the slider bearing. Accordingly, the above mentioned factors will largely determine the shape of the head and its pole face surface.

The invention may also be practiced by applying the liquid in a number of different ways. In a preferred method, oil is applied to the member whose surface moves laterally relative to the surface of the other or stationary member. The film of oil which forms and is carried past the surface of the stationary member exerts the necessary hydrodynamic force upon the latter to balance the biasing force applied thereon. Alternatively, the oil may be applied at the leading edge of the stationary member, where the moving surface picks it up and imparts lateral motion to it.

Figure 2:
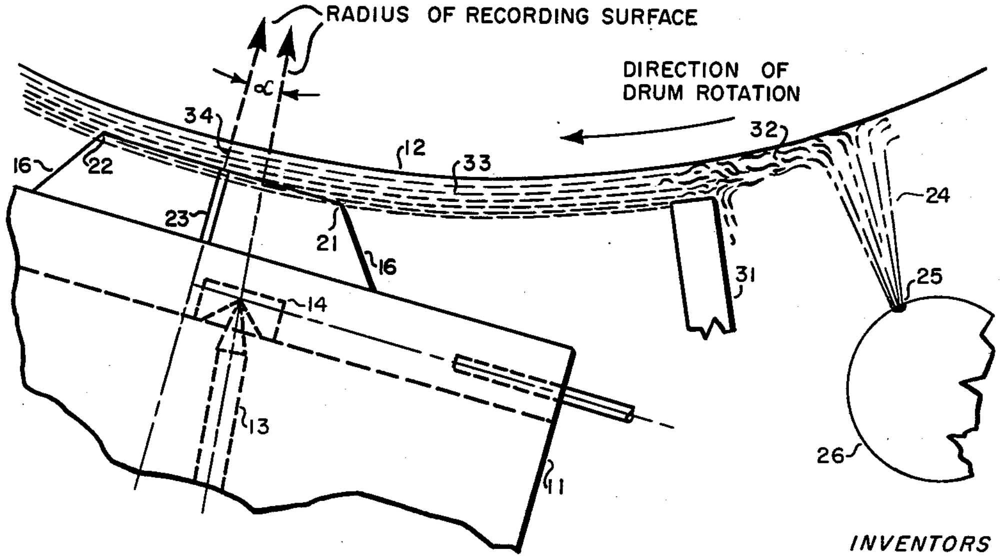
FIG. 2 illustrates the operation of the apparatus of FIG. 1 when fluid is applied and the drum is in motion.

With reference now to the drawings and particularly FIGS. 1 and 2 thereof, a plan view of the relative position of one of the magnetic heads 11 and the drum recording surface 12 is shown prior to the application of oil. Spring pressure applied to pivot pin 13, which mates with pivot bearing 14, is transmitted to the head and urges the common pole face surface 15 of pole pieces 16 against the recording surface, the pivot pin axis, the point of contact and the drum radius all being aligned, as shown. The pole face surface consists of a rectangular surface which is bounded by two side edges, a leading edge 21 and a trailing edge 22. Gap 23, which traverses the pole face surface centrally, contains a spacer of non-magnetic shim metal to form a magnetic discontinuity in the magnetic circuit formed by the pole pieces. As shown in FIG. 1, the pole face surface is out of contact with the recording surface in the vicinity of the gap and forms an angle "α" with a tangent to the recording surface at a point opposite the gap. As shown in FIG. 2, after drum rotation has been initiated, oil jets 24 emanate from nozzles 25 in oil gallery 26 and strike the rotating recording surface. Oil wiper 31, which is positioned close to the recording surface while spaced from the jets in the direction of drum rotation along the circumference of the recording surface, diverts the excess oil applied and tends to smooth out the initial flow turbulence 32 to form a uniform film of oil 33, on the recording surface. It should be noted that the thickness of the oil film is not critical and may vary in the instant case from 0.7 mil to 20 mils. The lower limit is established by the minimum equilibrium separation which is desired at the gap, and is based on the requirement that the entire pole face surface 15 be exposed to the oil. It will be evident from the drawings, that the sides of the pole pieces will be slightly submerged in the oil in this case. The upper limit corresponds to the extent to which pole pieces 16 protrude from head 11. A film of thickness in excess of 20 mils will result in an undesirable contribution to the hydrodynamic supporting force from the lower head surface. Wiper 31 serves the additional function of straining out metal and dirt particles which may cling to the recording surface, to prevent them from rotating under the pole face surface where they may damage the latter or the recording surface, or result in the loss of data by causing a temporary increase in the mutual separation of the pole face and recording surfaces. The lateral motion of the recording surface is imparted to the film of oil which clings thereto and creates a flow of oil relative to each pole face surface. The resultant hydrodynamic effect causes leading edge 21 of each pole face surface to increase its spacing from the recording surface relative to trailing edge 22, the resultant moment rotating the pole face surface through the angle "α" into a position where the gap assumes the point of minimum spacing from the recording surface. Concurrently, a component of force of the total hydrodynamic effect developed exerts a lifting force on the pole face surface, urging the latter away from the recording surface until equilibrium is reached between the spring pressure applied and said component of force at a predetermined spacing 34, as measured radially at the gap.

Figure 3:
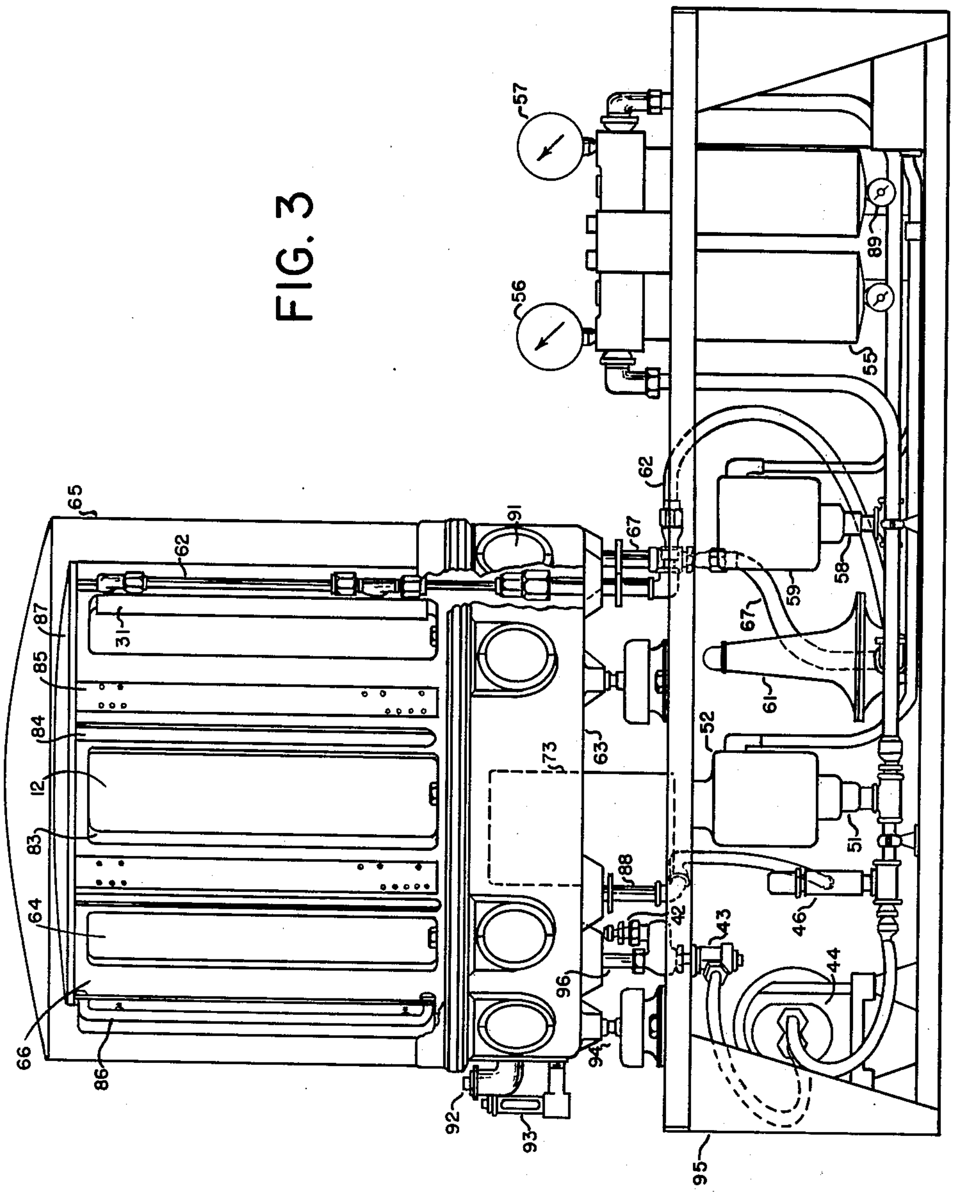
FIG. 3 is an elevation view of the structural aspects of the recording apparatus including the lubricating system.
Figure 4:
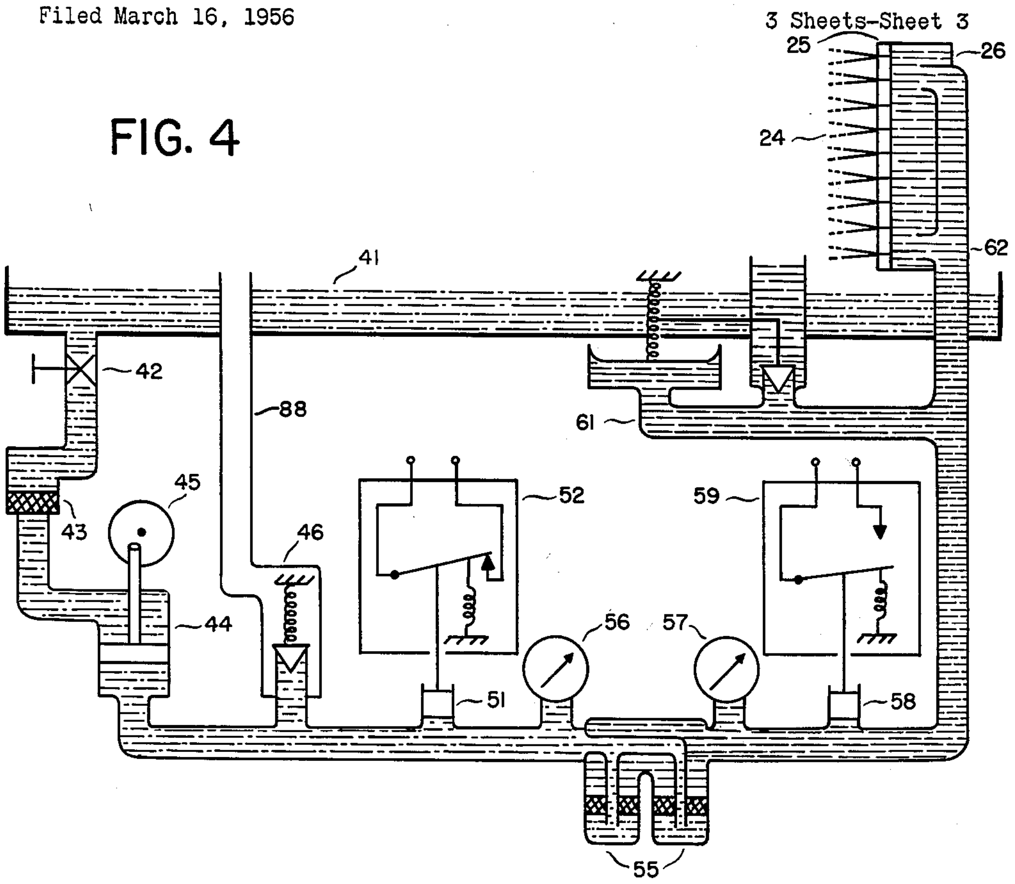
FIG. 4 is a schematic representation of the lubricating system.

The structural aspects of the invention are illustrated in FIGS. 3 and 4, FIG. 4 being a schematic illustration of the lubricating system included in the recording apparatus shown in FIG. 3. A vertical, cylindrical drum 64 having magnetic recording surface 12 is rotatably mounted within drum housing 66, drum motor 73 supplying the motive force through a suitable power transmission. The drum housing contains openings 83, spaced around its circumference, each opening exposing a section of the magnetic recording surface along the entire length of the drum. A plurality of horizontally positioned magnetic heads (not shown, but preferably of the type disclosed in the aforementioned application for "Magnetic Head Assemblies") is positioned in one or more openings of the drum housing, with the pole face surface of each head facing the magnetic recording surface, as illustrated in FIGS. 1 and 2. Accordingly, rotation of the drum will define a narrow track directly below each head on the recording surface due to the action of said head. The horizontally positioned heads of each opening form a vertical column, each head being supported by its individual head mount. Respective head mounts of each vertical column are attached to a common bracket, which in turn is mounted in slots 84 of the drum housing, adjacent a corresponding opening 83. Head mount terminal strips 85 are spaced around the circumference of the housing adjacent respective openings and are protected by terminal board covers 86. The head mount terminals are connected to external terminal 91 and supply the electrical connection between the magnetic heads and associated electrical apparatus. Sump housing 63 is located directly below the drum and contains sump 41 which constitutes the oil reservoir. Filler pipe 92 receives oil for the sump, while oil level gauge 93 indicates the amount of oil therein. The drum housing containing the drum is supported by vibration isolators 94 to minimize disturbances to the magnetic data storage system. The vibration isolators, in turn, are supported by frame 95 of the lubrication system. Sump outlet 96 contains shut-off valve 42. Oil is drained off when valve 42 is opened. A strainer 43 is connected in the line adjacent valve 42 to remove large metal and dirt particles which may clog the system. A pump 44 which is operated by pump motor 45 supplies the requisite pressure to force the oil through the system. Emergency pressure relief valve 46 is connected between the pump output and the sump to return the oil to the sump through pipe 88 if the oil pressure rises above a pre-set danger level. High pressure bellows 51 which is connected into the system adjacent valve 46, opens normally closed high pressure cut-off switch 52 whenever the pressure in the line exceeds a pre-set level, for example, 50 lbs. per square inch. Low pressure bellows 58 closes normally open switch 59 whenever the oil pressure in the system exceeds some minimum level, as for example, 10 lbs. per square inch. A doubler filter 55, having draincocks 89, is connected intermediate the pressure bellows to filter the oil before applying it to the recording surface. Pressure gauges 56 and 57 respectively, are connected at the input and output side of filter 55 to provide a differential pressure reading across the filter. Oil pipe 62 is connected to bellows 58 and terminates in two openings which pass the filtered oil into oil gallery 26. An oil pressure regulator 61 is connected into pipe 62 to maintain the oil pressure constant. It should be noted that the pressure is not critical and slight variations can be tolerated without affecting the spacing of the pole face surfaces from the recording surface. The excess oil supplied through pipe 62 is returned to the system via pipe 67. The oil supplied to gallery 26 is forced out in jets 24 through nozzles 25 spaced vertically along the length of the drum. As best shown in FIGS. 2 and 3, the excess oil applied to the drum recording surface 12 is diverted by wiper 31 and is returned to the sump. Enclosure 65, which prevents external dirt from entering the system, surrounds the drum housing to contain random oil spray thrown off the rotating drum by centrifugal action. This oil together with the oil which separates from the recording surface through the action of gavity, is collected in the sump to be re-circulated through the system.

Figure 5:
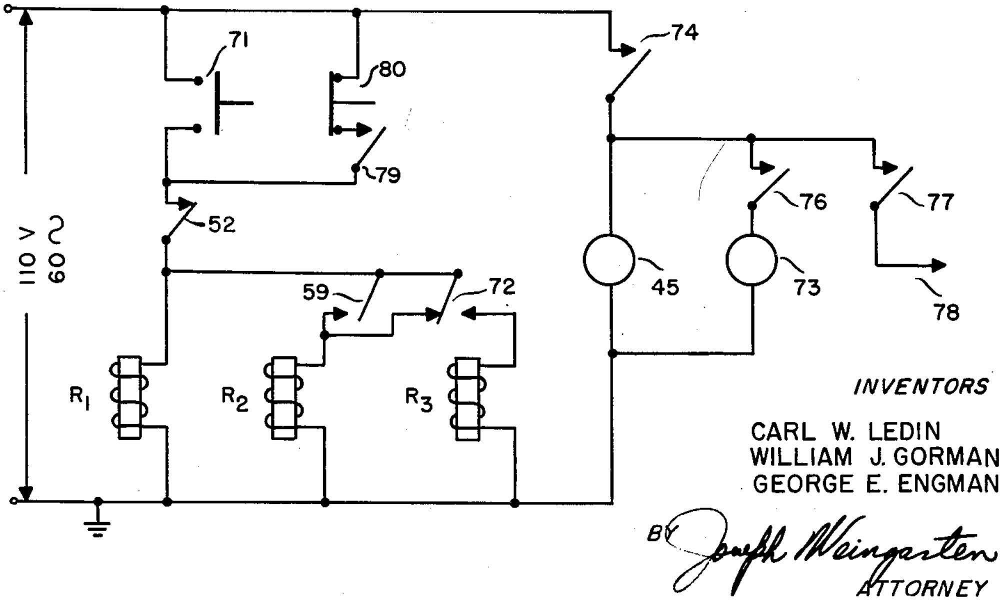
FIG. 5 is a simplified schematic representation of the electrical control system employed herein.

FIG. 5 illustrates the electrical control system of the apparatus. Normally open starting switch 71, high-pressure cut-off switch 52 and the winding of time delay relay $R_1$ are series connected across the power source, one terminal of the relay winding being connected to ground. Starter bypass switch 79, which is controlled by relay $R_2$, and normally closed stop switch 80 are series connected across starting switch 71. Low pressure cut-off switch 59 and the winding of main contactor relay $R_2$ are series connected across the winding of relay $R_1$. Double throw time delay switch 72, which is controlled by relay $R_1$, shunts the low pressure cut-off switch when the contact arm of the time delay switch contacts its left hand terminal. When the arm contacts the right hand terminal, the time delay switch is series connected with the winding of drum relay $R_3$, the latter series combination being connected in parallel with the winding of time delay relay $R_1$. Pump motor switch 74, which is controlled by the main contactor relay $R_2$, is connected in series with pump motor 45, the latter series combination being further connected across the power source. Drum motor switch 76, which is controlled by drum relay $R_3$, is connected in series with drum motor 73, the latter series combination being further connected across pump motor 45. Power bus switch 77, which is also controlled by drum relay $R_3$, is series connected between the high voltage terminal, of the pump motor and power bus 78, the latter supplying current to the electrical system, i.e. the power supply, relays, controls, et cetera.

In operation, the closing of starting switch 71 energizes time delay relay $R_1$ through normally closed high pressure cut-off switch 52. The time delay relay maintains switch 72 in its left hand contact position for a predetermined time period, set approximately at one minute, thereby bypassing the normally open low pressure cut-off switch 59. In that position, switch 72 causes main contractor relay $R_2$ to be energized. Relay $R_2$ closes starter bypass switch 79, whereby the circuit continues to be energized after starting switch 71 has re-opened. Relay $R_2$ also closes pump motor switch 74 to start pump motor 45. The rising oil pressure subsequently closes low pressure cut-off switch 59. After the expiration of the time delay period, if the low pressure switch has closed, the time delay relay $R_1$ causes switch 72 to contact its right hand terminal, thereby energizing drum relay $R_3$. The energized drum relay then closes switches 76 and 77 to start drum motor 73 and to supply power to bus 78. The oil is then applied to the recording surface as described in connection with FIGS. 1 and 2. It will be noted that the use of this control system prevents rotation of the magnetic drum without the application of oil thereto and hence eliminates wear on th pole face and recording surfaces during the starting period, or during operation of the apparatus if, for any reason, the oil supply fails. To interrupt the operation of the system, stop switch 80 is opened to break the circuit. The relays revert to the non-energized position thereby actuating the switches controlled by them and terminating further system operation.

Having thus described the invention, it will be apparent that numerous modifications and departures may now be made by those skilled in the art as explained above, all of which fall within the scope contemplated by the invention. Consequently, the invention herein disclosed is to be construed as limited only by the spirit and scope of the appended claims.

What is claimed is:

1. In a high-density magnetic data storage system, a drum having a magnetic recording surface, a plurality of magnetic heads each including a pole face surface spaced about said recording surface, said pole face surfaces being biased against said recording surface, means for rotating said drum, means for exchanging data between said heads and said recording surface, apparatus for maintaining constant separation between said pole face surfaces and said recording surface during operation comprising means independent of the number of said heads for spraying a limited region of said rotating surface with pressurized oil once per drum revolution, time delay means for preventing initial drum rotation before the oil pressure has reached a predetermined level, oil wiping means for diverting the excess oil applied while smoothing the remainder to form a uniform film of oil having predetermined limits of thickness on said recording surface, the motion of said recording surface being imparted to said film of oil to create oil flow relative to said pole face surfaces, said oil flow developing a hydrodynamic effect having a component of force which balances the biasing force applied to said heads at a predetermined mutual spacing of said pole face and recording surfaces.

2. In a high-density magnetic data storage system, a drum having a magnetic recording surface, a plurality of magnetic heads each including a pole face surface spaced about said recording surface, said pole face surfaces being biased against said recording surface, a drum motor for rotating said drum, means for exchanging data between said heads and said recording surface, means for maintaining constant separation between said pole face surfaces and said recording surface during operation comprising a supply of oil, a pump motor, an oil pump actuated by said pump motor for spraying said rotating recording surface with pressurized oil independently of the number of magnetic heads employed, means for energizing said motors, first means for preventing the energization of said drum and pump motors respectively whenever the oil pressure drops below a predetermined low-pressure level, second means for preventing the energization of said drum and pump motors respectively whenever the oil pressure exceeds a predetermined high-pressure level, time delay means adapted to shunt said first means and energize said pump motor upon initial energization of said system while preventing energization of said drum motor until the oil pressure has reached said predetermined low-pressure level, an oil wiper spaced from said spraying means in the direction of drum rotation along the circumference of said recording surface, said oil wiper diverting the excess oil applied and returning it to the oil supply while smoothing the remainder to form a uniform film of oil having predetermined limits of thickness on said recording surface, the motion of said recording surface being imparted to said film of oil to create oil flow relative to said pole face surfaces, said oil flow developing a hydrodynamic effect having a component of force which balances the biasing force applied to said heads at a predetermined mutual spacing of said pole face and recording surfaces.

3. In a high-density magnetic data storage system, a drum having a magnetic recording surface, a plurality of magnetic heads each including a pole face surface spaced about said recording surface, said pole face surfaces being biased against said recording surface, a drum motor for rotating said drum, means for exchanging data between said heads and said recording surface, means for maintaining constant separation between said pole face surfaces and said recording surface during operation comprising a supply of oil, a pump motor, an oil pump actuated by said pump motor, means for spraying said rotating recording surface with pressurized oil at a location a substantial distance from said heads, means for energizing said motors, an oil wiper spaced from said spraying means in the direction of drum rotation along the circumference of said recording surface, said wiper diverting the excess oil applied and returning it to the oil supply while smoothing the remainder to form a uniform film of oil having predetermined limits of thickness on said recording surface, the motion of said recording surface being imparted to said film of oil to create oil flow relative to said pole face surfaces, said oil flow developing a hydrodynamic effect having a component of force which balances the biasing force applied to said heads at a predetermined mutual spacing of said pole face and recording surfaces, a normally closed high pressure cut-off switch adapted to be opened whenever the oil pressure exceeds a first predetermined pressure level, a normally open low pressure cut-off switch adapted to be closed whenever the oil pressure exceeds a second predetermined pressure level, said cut-off switches interrupting current flow to said pump and drum motors respectively whenever the oil pressure falls outside the range of said predetermined pressure levels, a time delay relay circuit for bypassing said low pressure cut-off switch to supply current to said pump motor while preventing current flow to said drum motor upon initial energization of the system, said time delay relay circuit being operative for a predetermined period after initial energization of the system.

4. In a high-density magnetic data storage system, a vertical, cylindrical drum having a magnetic recording surface, a plurality of magnetic heads each including a pole face surface spaced about said recording surface, said pole face surfaces being biased against said recording surface, a drum motor for rotating said drum about its axis, means for exchanging data between said heads and said recording surface, means for maintaining constant separation between said pole face surfaces and said recording surface during operation comprising a sump of oil located below said drum, a pump motor, an oil pump actuated by said pump motor to place said oil under pressure, an oil strainer intermediate said sump and said pump, a pressure relief valve bypassing said pump to return said oil to the sump whenever the pressure exceeds a preset danger level, a first pressure bellows connected into the system, a high pressure cut-off switch actuated by said first bellows, said high pressure cut-off switch being normally closed but adapted to be opened by said first pressure bellows whenever the oil pressure exceeds a predetermined high pressure level, a second pressure bellows connected into the system, a low pressure cut-off switch actuated by said second bellows, said low pressure cut-off switch being normally open but adapted to be closed by said second pressure bellows whenever the oil pressure exceeds a predetermined low pressure level, a source of power to energize said motors, said switches interrupting current flow to said pump and drum motors respectively whenever the oil pressure falls outside the range of said predetermined pressure levels, an oil filter intermediate said two pressure bellows, a pressure gauge interposed between said filter and each of said pressure bellows, said pressure gauges adapted to measure the differential pressure across said filter, an oil gallery extending the length of the drum and spaced therefrom parallel to the drum axis, oil nozzles spaced along the length of said gallery facing the recording surface, said nozzles adapted to spray said rotating recording surface with jets of oil, an oil pressure regulator intermediate said oil gallery and said second pressure bellows adapted to regulate the pressure of said jets, an oil wiper spaced from said jets in the direction of drum rotation along the circumference of said recording surface, said wiper straining out metal and dirt particles to prevent damage to the magnetic surfaces and to forestall the loss of data due to lifting of the heads, said wiper further diverting the excess oil applied and returning it to the sump while smoothing the remainder to form a uniform film of oil having predetermined limits of thickness on said recording surface, the motion of said drum being imparted to said film of oil to create oil flow relative to said pole face surfaces and to develop a hydrodynamic effect, a component of force of said hydrodynamic effect balancing the biasing force applied to said heads at a predetermined mutual spacing of said pole face and recording surfaces, said oil film separating from said recording surface under the action of gravitational and centrifugal forces and being collected to be returned to the sump.

5. The apparatus of claim 4 including a time delay relay, a time delay switch actuated by said time delay relay, said time delay switch adapted to bypass the low-pressure cut-off switch for a predetermined period upon initial energization of the system, whereby said pump motor alone is energized during said period to enable the pump to raise the oil pressure to said predetermined low pressure level prior to the inception of drum rotation.

6. In a high-density magnetic data storage system a vertical, cylindrical drum having a magnetic recording surface, a plurality of magnetic heads each including a pole face surface spaced about said recording surface, said pole face surfaces being biased against said recording surface, a drum motor for rotating said drum, means for exchanging data between said heads and said recording surface, means for maintaining constant separation between said pole face surfaces and said recording surface during operation comprising an oil sump located below said drum, a pump motor, an oil pump actuated by said pump motor and adapted to place said oil under pressure, an oil strainer intermediate said sump and said pump, a pressure relief valve bypassing said pump to return said oil to the sump whenever the pressure exceeds a pre-set danger level, a first pressure bellows connected into the system, a high pressure cut-off switch actuated by said first pressure bellows, said high pressure cut-off switch being normally closed but adapted to be opened by said first pressure bellows whenever the oil pressure exceeds a predetermined high pressure level, a second pressure bellows connected into the system, a low pressure cut-off switch actuated by said second pressure bellows, said low pressure cut-off switch being normally open but adapted to be closed by said second pressure bellows whenever the oil pressure exceeds a predetermined low pressure level, an oil filter intermediate said two pressure bellows, a pressure gauge connected at the input and at the output of said filter, said pressure gauges adapted to measure the differential pressure across said filter, an oil gallery extending the length of the drum and spaced therefrom parallel to the drum axis, oil nozzles spaced along the length of said gallery facing the recording surface, said nozzles adapted to spray said rotating recording surface with jets of oil, an oil pressure regulator intermediate said oil gallery and said second pressure bellows adapted to regulate the pressure of said jets, an oil wiper spaced from said jets in the direction of drum rotation along the circumference of said recording surface, said wiper straining out metal and dirt particles to prevent damage to the magnetic surfaces and to forestall the loss of data due to lifting of the heads, said wiper further diverting the excess oil applied and returning it to the sump while smoothing the remainder to form a uniform film of oil having predetermined limits of thickness on said recording surface, the motion of said drum being imparted to said film of oil to create oil flow relative to said pole face surfaces, said oil flow developing a hydrodynamic effect having a component of force which balances the biasing force applied to said heads at a predetermined mutual spacing of said pole face and recording surfaces, said oil film separating from said recording surface under the action of gravitational and centrifugal forces and being collected to be returned to the sump, a source of electrical power, a normally open starting switch connected in series between said source and said high pressure cut-off switch, a normally closed stop switch, a starter bypass switch, said stop switch and starter bypass switch being series connected across said starting switch, a time delay relay having its winding connected in series between a first junction point tied to said high pressure cut-off switch and ground, said low pressure cut-off switch connected between said first junction point and a second junction point, a main contactor relay having its winding connected between said second junction point and ground, a double throw time delay switch having its contact arm connected to said first junction point, a first contact of said double throw switch being connected to said second junction point, a second contact of said double throw switch being connected to a third junction point, said double throw switch being actuated by said time delay relay to have its contact arm in the first contact position upon closing of the starting switch and in the second contact position a predetermined time period thereafter, a drum relay having its winding connected between said third junction point and ground, a pump motor switch adapted to be actuated by said main contactor relay connected between said source and a fourth junction point, said pump motor being connected between said fourth junction point and ground, a drum motor switch adapted to be actuated by said drum relay connected in series with said drum motor, the last recited series combination being connected between said fourth junction point and ground, a power bus adapted to supply current to the electrical system, and a bus switch adapted to be actuated by said drum relay switch connected in series between said fourth junction point and the power bus; whereby said high and low pressure cut-off switches interrupt current flow to said pump and drum motors, respectively, whenever the oil pressure falls outside the range of said predetermined pressure levels and said time delay relay actuates said double throw switch to bypass said low pressure cut-off switch upon starting the system to energize the pump motor alone for a predetermined time period and to raise the oil pressure to said predetermined low-pressure level prior to the inception of drum rotation.

References Cited in the file of this patent

UNITED STATES PATENTS

| | | |
|---|---|---|
| 872,039 | Adams | Nov. 26, 1907 |
| 1,630,713 | Meyer | May 31, 1927 |
| 2,062,250 | Moller | Nov. 24, 1936 |
| 2,502,318 | Fischer | Mar. 28, 1950 |
| 2,603,697 | Korte | July 15, 1952 |
| 2,612,566 | Anderson et al. | Sept. 30, 1952 |
| 2,614,169 | Cohen | Oct. 14, 1952 |
| 2,692,803 | Gerard | Oct. 26, 1954 |
| 2,722,463 | Shaw | Nov. 1, 1955 |
| 2,736,106 | Offen | Feb. 28, 1956 |
| 2,743,933 | Baines | May 1, 1956 |
| 2,772,135 | Hollabaugh et al. | Nov. 27, 1956 |
| 2,787,750 | Jones | Apr. 2, 1957 |
| 2,862,781 | Baumeister II | Dec. 2, 1958 |
| 2,928,709 | Baumeister I | Mar. 15, 1960 |